United States Patent
Jayasuriya et al.

(10) Patent No.: US 9,582,025 B2
(45) Date of Patent: Feb. 28, 2017

(54) SYSTEMS AND METHODS FOR PRESSURE ACTUATED PEDAL CONTROL

(71) Applicant: FORD GLOBAL TECHNOLOGIES, LLC, Dearborn, MI (US)

(72) Inventors: Mangala A. Jayasuriya, Bloomfield Hills, MI (US); Mark Allan Lippman, New Baltimore, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 14/593,551

(22) Filed: Jan. 9, 2015

(65) Prior Publication Data

US 2016/0202719 A1    Jul. 14, 2016

(51) Int. Cl.
| | |
|---|---|
| *B60T 7/04* | (2006.01) |
| *G05G 1/44* | (2008.04) |
| *B60T 8/40* | (2006.01) |
| *B60K 23/02* | (2006.01) |
| *B60T 13/66* | (2006.01) |
| *B60T 8/32* | (2006.01) |

(52) U.S. Cl.
CPC ............ *G05G 1/44* (2013.01); *B60K 23/02* (2013.01); *B60T 7/042* (2013.01); *B60T 8/3255* (2013.01); *B60T 8/4086* (2013.01); *B60T 13/662* (2013.01); *B60T 2220/04* (2013.01)

(58) Field of Classification Search
CPC ...... B60T 7/042; B60T 17/18; B60T 2220/04; B60T 7/06; B60W 2540/10; B60W 2540/12

USPC ............... 701/70; 188/152, 158; 192/220; 280/124.162

See application file for complete search history.

(56) References Cited

U.S. PATENT DOCUMENTS

| | | | |
|---|---|---|---|
| 4,690,465 A * | 9/1987 | Takeda | B60T 8/369 188/158 |
| 5,115,162 A | 5/1992 | Leonard et al. | |
| 5,116,051 A | 5/1992 | Moncrief et al. | |
| 5,350,225 A | 9/1994 | Steiner et al. | |
| 6,213,564 B1 * | 4/2001 | Face, Jr. | B60T 7/042 188/158 |
| 6,655,199 B1 | 12/2003 | Smith | |

(Continued)

FOREIGN PATENT DOCUMENTS

| | | |
|---|---|---|
| JP | 2006-076534 A | 3/2006 |
| JP | 2006-285306 A | 10/2006 |

(Continued)

*Primary Examiner* — Dalena Tran
(74) *Attorney, Agent, or Firm* — Jones Robb, PLLC; Raymond L. Coppiellie (57) ABSTRACT

Electronic pedal control systems and methods for a vehicle are provided. One electronic pedal control system includes a first sensor configured to produce a first output corresponding to a user applied force and a second sensor configured to produce a second output corresponding to a release of user applied force. A controller is configured to receive the first output and the second output and to control one of a brake system, a clutch system, and a throttle system of the vehicle based on the first and second outputs, and the first and second sensors are positioned relative to one another such that an application of force to the first sensor unloads the second sensor and the removal of force from the first sensor loads the second sensor.

20 Claims, 7 Drawing Sheets

(56) References Cited

U.S. PATENT DOCUMENTS

| | | | |
|---|---|---|---|
| 6,883,658 B2 * | 4/2005 | Reul | F16D 25/083 |
| | | | 192/30 W |
| 8,812,212 B2 | 8/2014 | Tomlinson et al. | |
| 2007/0296268 A1 | 12/2007 | Shaw et al. | |
| 2012/0006145 A1 * | 1/2012 | Hotta | G05G 1/38 |
| | | | 74/513 |
| 2013/0144481 A1 | 6/2013 | Syed et al. | |
| 2015/0142290 A1 * | 5/2015 | Van Saanen | G05G 1/32 |
| | | | 701/70 |

FOREIGN PATENT DOCUMENTS

| | | |
|---|---|---|
| JP | 2009-073343 A | 4/2009 |
| KR | 20130123618 A | 11/2013 |

* cited by examiner

SYSTEMS AND METHODS FOR PRESSURE ACTUATED PEDAL CONTROL

TECHNICAL FIELD

The present teachings relate generally to systems and methods for pressure actuated pedal control in motor vehicles. More specifically, the present teachings relate to systems and methods for detecting both a force applied to a pedal of a vehicle as well as the release of the force from the pedal while reducing the distance the pedal may travel upon application of a force to the pedal.

BACKGROUND

In motor vehicles, pedals are often provided to enable a user to communicate with one or more control systems in the vehicle to regulate the power output of the vehicle in accordance with the demand from the user. For example, an accelerator pedal is often provided to enable the user to communicate the amount of desired acceleration to the vehicle controller. Other pedals, such as brake and clutch pedals, may also be provided to enable the user to communicate other operational commands to the system controller. Existing pedals typically use lever style assemblies in which a pedal is mounted to a pivoting arm and is physically depressed by the user to indicate a desire for an operational change, such as increased or decreased power output.

However, the need for the physical displacement of the pedals may result in pedal failure in instances in which the movement path of the pedal is obstructed. Additionally, such lever style assemblies may present additional drawbacks due to their mechanical complexity, which introduces high monetary cost. Accordingly, there exists a need for systems and methods that address these drawbacks with traditional pedals for motor vehicles.

SUMMARY

In accordance with one aspect of the present disclosure, a pedal for a vehicle is provided. The pedal system comprises includes a pedal configured to receive an applied pressure when a user applies a force on the pedal and a first sensor having piezoelectric material and configured to produce a first voltage output corresponding to the applied pressure when the user applies the force on the pedal. The pedal system also includes a second sensor having piezoelectric material and configured to produce a second voltage output corresponding to an amount of pressure released from the pedal when the user at least partially removes the force from the pedal.

In accordance with another aspect of the present disclosure, a method of operating a pedal control system for a vehicle is provided. The method comprises sensing an applied pressure to a pedal with a first piezoelectric sensor when a user applies a force on the pedal and producing a first voltage output corresponding to the applied pressure. The method also comprises controlling one of a brake system, a clutch system, and a throttle system of the vehicle based on the first voltage output and sensing a released pressure corresponding to an amount of pressure released from the pedal when the user at least partially removes the force from the pedal with a second piezoelectric sensor. The method further comprises producing a second voltage output corresponding to the released pressure and controlling the one of the brake system, the clutch system, and the throttle system based on the second voltage output.

In accordance with a further aspect of the present disclosure, an electronic pedal control system for a vehicle is provided. The electronic pedal control system comprises a first sensor configured to produce a first output corresponding to a user applied force and a second sensor configured to produce a second output corresponding to a release of user applied force. A controller is configured to receive the first output and the second output and to control one of a brake system, a clutch system, and a throttle system of the vehicle based on the first and second outputs. The first and second sensors are positioned relative to one another such that an application of force to the first sensor unloads the second sensor and the removal of force from the first sensor loads the second sensor.

In accordance with another aspect of the present disclosure, a method of operating an electronic pedal system of a vehicle is provided. The method comprises sensing a user applied force with a first sensor and producing a first output corresponding to the sensed applied force. In response to a user at least partially removing the applied force from the first sensor, a second sensor senses a change in force corresponding to an amount of force released by the user and produces a second output corresponding to the change in force. The method further includes controlling, with a vehicle controller, one of a brake system, a clutch system, and a throttle system of the vehicle based on the first and second outputs.

In accordance with yet another aspect of the present disclosure, an electronic pedal simulator for a vehicle is provided. The electronic pedal simulator comprises a first sensor configured to produce a first output corresponding to a user applied force and a second sensor configured to produce a second output corresponding to a release of user applied force. The first and second sensors are positioned relative to one another such that an application of force to the first sensor unloads the second sensor and the removal of force from the first sensor loads the second sensor.

Additional objects and advantages of the present teachings will be set forth in part in the description which follows, and in part will be obvious from the description, or may be learned by practice of the present teachings. Various objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings.

The accompanying drawings, which are incorporated in and constitute a part of this specification, illustrate embodiments of the present teachings and together with the description, serve to explain the principles of the present teachings.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative exemplary embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The illustrated exemplary embodiments are not intended to limit the disclosure. To the contrary, the disclosure is intended to cover alternatives, modifications, and equivalents.

Provided herein are vehicle pedal systems capable of sensing an amount of force applied to a pedal and an amount of force removed from the pedal, as well as methods of controlling a motor vehicle having such a pedal system. For example, in one embodiment, a pedal system includes two sensors positioned relative to one another such that an application of force to the first sensor unloads the second sensor, and the removal of force from the first sensor loads the second sensor. In such a system, the amount of force applied to a pedal of a vehicle, as well as the amount of force removed from the pedal of the vehicle, may be determined and utilized to control one or more of a clutch system, a brake system, and a throttle system, for example, by integrating the sensor feedback with a vehicle safety system and a vehicle diagnostic systems.

Presently disclosed embodiments may offer one or more advantages over traditional pedal assemblies by reducing or eliminating the need for pedal movement along a pedal travel path while maintaining the ability to determine the force applied to and removed from the pedal. For example, some presently disclosed embodiments enable accurate detection of forces applied to and removed from the pedal by using piezoelectric sensors to interpret a force applied to the pedal and a force removed from the pedal, thus mimicking the signals that would be generated in a movement-based pedal system without the need for the pedal to travel along the pedal travel path, i.e., the simulation of a movement-based pedal. In such embodiments, the piezoelectric sensors may be utilized to produce a voltage output corresponding to the sensed forces, which may be transmitted to a vehicle control system, which uses the signals to generate, either alone or in combination with other feedback, a corresponding output for the motor vehicle (e.g., power output, braking force, etc.). In this way, force or pressure sensors may be utilized to create the response to a user-applied force and removal of such a force with reduced or eliminated travel required by the pedal. The foregoing feature may reduce the mechanical complexity of the pedal assembly and/or reduce or prevent the likelihood that an object will interfere with the travel of the pedal. These and other features of the presently disclosed embodiments are discussed in more detail below.

Figure 1:
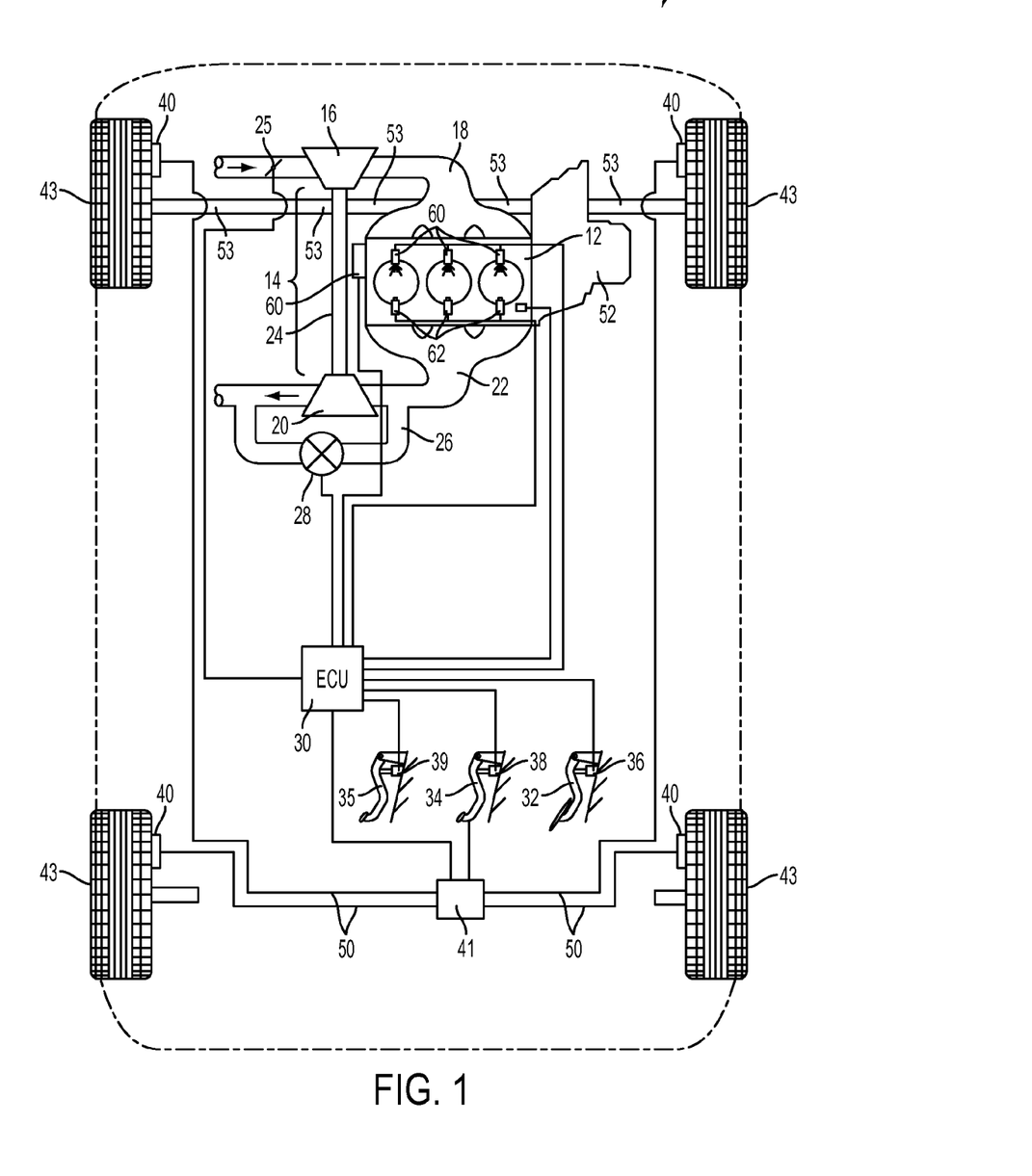
FIG. 1 is a schematic diagram illustrating an embodiment of a motor vehicle including pedals having sensors for detecting forces applied to and removed from the pedals.

Turning now to the drawings, FIG. 1 is a schematic illustrating a vehicle 10 that includes an internal combustion engine 12 with a turbocharger 14. Turbocharger 14 has an exhaust turbine 20 disposed in an exhaust duct 22 of engine 12, a compressor 16 disposed in an intake duct 18 of engine 12, and a shaft 24 coupling turbine 20 and compressor 16. A throttle valve 25 is in intake duct 18 and is actuated under command of an electronic control unit (ECU) 30 to control flow of air into the engine 12. A bypass duct 26 to the turbine 20 has a valve 28 disposed therein that is actuated under control of the ECU 30. The bypass duct 26 and valve 28 are commonly called a wastegate.

In the embodiment shown in FIG. 1, a single ECU 30 for controlling the vehicle 10 is illustrated. However, it should be noted that this configuration is merely an example and is subject to a variety of implementation-specific variations. For example, in some embodiments, the functions described in reference to ECU 30 may be performed across multiple ECUs or among multiple components of the ECU 30. Further, the ECU 30 may include one or more structural components (e.g., microprocessors) that enable the ECU 30 to function as a controller. Indeed, the ECU 30, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system or controller to operate the logic or portions of the logic presented in the methods disclosed herein. For example, in certain embodiments, the ECU 30 may include computer code disposed on a computer-readable storage medium or a process controller that includes such a computer-readable storage medium. The computer code may include instructions, for example, for initiating a control function to change the operation of a clutch system, a brake system, and/or a throttle system based on feedback received from another component of the vehicle 10, such as one or more sensors associated with one or more pedals of the vehicle 10.

The depicted vehicle 10 further includes operator controls in the form of an accelerator pedal 32, a brake pedal 34, and a clutch pedal 35, which the operator of the vehicle 10 uses to indicate a desire for forward acceleration, braking, or a connection or disconnection between an engine and a transmission. It should be noted that each of the pedals 32, 34, and 35 may be of a variety of suitable types, depending on implementation-specific considerations. For example, one or more of the pedals 32, 34, and 35 may be floor or wall mounted, such as "standing" through the floor pan or "hanging" from the firewall. Further, while the depicted embodiment includes three pedals, other embodiments may include two pedals, for example, in a vehicle with an automatic transmission.

In the illustrated embodiment, the accelerator pedal 32 is coupled to a sensor assembly 36 that communicates feedback regarding force applied to the accelerator pedal 32 and force removed from the accelerator pedal 32 to ECU 30. Similarly, the brake pedal 34 is coupled to a sensor assembly 38 that communicates feedback regarding force applied to the brake pedal 34 and force removed from the brake pedal 34 to ECU 30, and the clutch pedal 35 is coupled to a sensor assembly 39 that communicates feedback regarding force applied to the clutch pedal 35 and force removed from the clutch pedal 35 to ECU 30.

Each of the sensor assemblies 36, 38, and 39 may include one or more sensors configured to sense both the force applied to the respective pedal associated with the given sensor assembly, as well as the force removed from the respective pedal associated with the given sensor assembly. As such, each of the sensor assemblies 36, 38, and 39 may include one or more of a load sensor, a force sensor, a pressure sensor, a strain gauge resistive sensor, piezoelectric pressure sensors, piezoelectric torsional sensors, capacitor sensors, gears, springs, nuts, rods, or any other component configured to enable the sensing of a force applied to and removed from the pedals 32, 34, and 35. Further, the sensor assemblies 36, 38, and 39 may be integrally engaged with the pedals 32, 34, and 35 such that the sensor assemblies 36, 38, and 39 (or the sensors provided alone or in combination with other components as part of the sensor assemblies 36, 38, and 39) are positioned in such a way that they are able to communicate mechanically and/or electronically with the pedals 32, 34, and 35. For example, sensors may be embedded within the accelerator pedal 32, the brake pedal 34, and/or the clutch pedal 35, such that the sensors are permanently situated within the accelerator pedal 32, the brake pedal 34, and/or the clutch pedal 35.

It is further contemplated that the sensor assemblies 36, 38, and 39 may also be removable or non-permanently situated within the accelerator pedal 32, the brake pedal 34, and the clutch pedal 35, respectively. Additionally, it is contemplated that the sensor assemblies 36, 38, and 39 may rest in a preformed cavity within the accelerator pedal 32, the brake pedal 34, and the clutch pedal 35, respectively, or be positioned on top of the accelerator pedal 32, the brake pedal 34, and/or the clutch pedal 35, respectively, or partially embedded in the accelerator pedal 32, the brake pedal 34, and/or the clutch pedal 35, respectively. Further embodiments may be contemplated in which sensors may snap into the accelerator pedal 32, the brake pedal 34, and/or the clutch pedal 35, or be fastened or held into place on the accelerator pedal 32, the brake pedal 34, and/or the clutch pedal 35.

It is further contemplated that the sensor assemblies 36, 38, and 39 may not be mechanically attached to the accelerator pedal 32, the brake pedal 34, and/or the clutch pedal 35 and may only form an electrical connection with the accelerator pedal 32, the brake pedal 34, and/or the clutch pedal 35. Indeed, it is contemplated that any number of spatial, mechanical and electrical arrangements may be configured between the sensor assemblies 36, 38, and 39 and the accelerator pedal 32, the brake pedal 34, and/or the clutch pedal 35, and therefore, the embodiments described herein are merely examples, not meant to limit the possible configurations.

Examples of possible sensor assemblies and their operation are shown and described in more detail below with respect to FIGS. 2, 3, and 5. However, in general, in operation, a user applies a force to, for example, the accelerator pedal 32, and the sensor assembly 36 senses the applied force and produces a voltage signal corresponding to the sensed force, which is then transmitted to the ECU 30 for processing. Similarly, when the user removes force from the accelerator pedal 32, the sensor assembly 36 senses the removal of pressure from the accelerator pedal 32 and produces a voltage signal corresponding to the removed force, which is then transmitted to the ECU 30 for further processing and use in operation of the vehicle 10. Features of the vehicle control that may be performed in response to the sensed pressure and pressure removal are discussed in more detail below. However, it is contemplated that the ECU 30 may communicate with other vehicle control systems during this process, even though many of the other vehicle control systems are not specifically described herein.

For example, it is contemplated that the ECU 30 may directly or indirectly transmit signals, including signals indicative of a force applied to and/or removed from the accelerator pedal 32, the brake pedal 34, and the clutch pedal 35 to, for example, a throttle controller, a fuel injection controller, a traction control system, antilock brake systems, etc. It is also contemplated that there may be any number of vehicle control systems that can be combined or grouped together to form additional different vehicle control systems, and therefore, the vehicle control systems are not meant to be mutually exclusive from each other and some overlap between vehicle control systems is to be contemplated. It is further contemplated that the ECU 30 can interpret and transmit a wide variety of signals, in addition to signals indicative of a force applied to or removed from the accelerator pedal 32, the brake pedal 34, and/or the clutch pedal 35 including, for example, those from engine sensors.

In conventional braking systems, the brake pedal 34 is coupled to a brake booster 41 that connects to hydraulic lines and actuates calipers to clamp down on discs at wheels 43 of the vehicle 10. In operation, the operator actuates the brake pedal 34 and such actuation is assisted by the brake booster 41 to thereby actuate brakes 40 coupled to the wheels 43. In some braking systems, the brakes 40 may be actuated independent of operator activity, such as for roll stability control or electronic stability control. The ECU 30 may command actuation of one or more of the brakes 40 to improve vehicle stability in response to destabilizing maneuvers or to prevent roll over of the vehicle 10.

Further, the ECU 30 may command one of the brakes 40 to act upon one of the vehicle wheels 43 independent of the operator depressing the brake pedal 34. In some embodiments, the sensor assembly 38 detects operator input to the brake pedal 34, and the output of the brake sensor assembly 38 is provided to ECU 30, which commands a pressure to apply to calipers of the brakes 40. In some embodiments, the vehicle 10 may employ a brake-by-wire configuration, and a pressure sensor in the brake booster 41 indicates the pressure acting upon the brakes 40. In such a brake-by-wire configuration, the ECU 30 may also command the brakes 40 to be applied to one or more of the wheels 43 independent of an operator commanding braking by depressing the brake pedal 34.

Further, in the illustrated embodiment, the engine 12 is coupled to a transmission 52. In one embodiment, the transmission 52 is an automatic transmission with a torque converter. The torque converter causes the vehicle to creep when the transmission 52 is in gear and neither the accelerator pedal 32 nor the brake pedal 34 is depressed. In another embodiment, the transmission 52 is a conventional manual transmission with a clutch (not individually shown in FIG. 1) coupled between the engine 12 and the transmission 52. The clutch is controlled by the operator of vehicle 10 via the clutch pedal 35.

In another embodiment, the transmission 52 is a dual clutch transmission (DCT) that includes two manual transmissions in one unit. In such an embodiment, odd gears are coupled to one clutch and even gears are coupled to a second clutch. The transmission 52 may be fully automatic with the ECU 30, or gear selection may be controlled by the vehicle operator. The clutches remain under control of the ECU 30. In yet another embodiment, the transmission 52 is an automatic shifting manual (ASM), which is similar to a conventional manual transmission except that the clutch is under robotic control. The gears may be controlled by the ECU 30 or by the vehicle operator.

Further, in the illustrated embodiment, the transmission 52 is coupled to the wheels 43 via a drive train including a shaft 53 coupled to the wheels 43. The embodiment in FIG. 1 shows a two-wheel drive configuration. However, the presently disclosed embodiments of the sensor assemblies 36, 38, and 39 associated with the pedals 32, 34, and 35, respectively, are applicable to any suitable configuration, such as, but not limited to, four-wheel drive vehicles.

In the depicted embodiment, the engine 12 includes fuel injectors 60 that are coupled to engine cylinders, which is a configuration that may be utilized with direct-injection gasoline or diesel engines. In port-injected, gasoline engines, fuel injectors are located in the intake manifold 18. Pulse width and timing of the fuel injection is controlled via the ECU 30. The fuel injectors 60 are supplied pressurized fuel from a fuel tank of a fuel system via at least one pump. In a gasoline engine, engine cylinders are also provided with spark plugs 62, the timing of which is controlled by the ECU 30. In some embodiments, the engine 12 may be provided with a variable cam timing (VCT) device to adjust the timing of the intake valves with respect to the piston position. Cam timing is controlled via the ECU 30. In other embodiments, an exhaust VCT is also provided.

Figure 2:
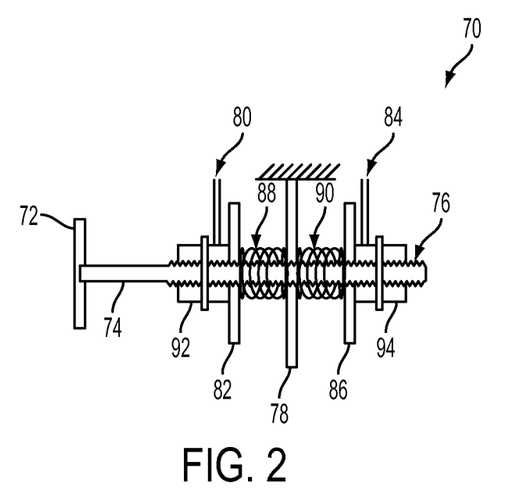
FIG. 2 is a schematic diagram illustrating an electronic pedal system including two piezoelectric pressure sensors for sensing a force applied to a pedal and a force removed from the pedal, according to a presently disclosed embodiment.

FIG. 2 is a schematic illustrating an embodiment of a sensor assembly 70 including a pedal 72 coupled to a threaded rod 74 having a threaded portion 76 for receiving one or more components of the sensor assembly 70. A support plate 78 is provided to couple the pedal 72 to the vehicle 10 and may be, for example, anchored to the floor or dash panel of the vehicle 10. The sensor assembly 70 further includes a first piezoelectric sensor 80 proximate a first pressure plate 82 and a second piezoelectric sensor 84 proximate a second pressure plate 86. A first spring 88 is provided between the first pressure plate 82 and the support plate 78, and a second spring 90 is provided between the second pressure plate 86 and the support plate 78. Additionally, preloading nuts 92 and 94 are provided on the ends of the threaded portion 76 of the threaded rod 74 proximate the first piezoelectric sensor 80 and the second piezoelectric sensor 84, respectively.

In operation, the first piezoelectric sensor 80 may be utilized to sense an amount of force applied by the user to the pedal 72, and the second piezoelectric sensor 84 may be utilized to sense an amount of force removed by the user from the pedal 72. More specifically, in the embodiment of FIG. 2, the first piezoelectric sensor 80 and the second piezoelectric sensor 84 are positioned relative to one another such that an application of force to the first piezoelectric sensor 80 unloads the second piezoelectric sensor 84, and the removal of force from the first piezoelectric sensor 80 loads the second sensor 84. In this embodiment, the foregoing feature is enabled by the first and second springs 88 and 90.

In particular, when the user applies a force to the pedal 72, the first spring 88 becomes compressed, thus applying pressure sensed by the first piezoelectric sensor 80, and the second spring 90 is expanded, thus relaxing the load on the second piezoelectric sensor 84. Similarly, when the user removes a force from the pedal 72, the second spring 90 becomes compressed, thus applying pressure sensed by the second piezoelectric sensor 84, and the first spring 88 is expanded, thus relaxing the load on the first piezoelectric sensor 80. In this way, the first piezoelectric sensor 80 may be utilized to sense the force applied to the pedal 72 by the user when the user presses the pedal 72, and the second piezoelectric sensor 84 may be utilized to sense the force removed when the user releases the pedal 72. The foregoing feature may offer advantages over systems that include only a single piezoelectric sensor capable of indicating only the force applied to the pedal, without providing for detection of pedal release. For example, presently disclosed embodiments enable constant monitoring of pedal position because a sensor signal is produced based on any change in force on the pedal 72 in any of the range of positions allowed to the pedal 72.

Further, when each of the first and second piezoelectric sensors 80 and 84 are loaded, a voltage output is produced, the amount of which is proportional to the pressure applied to or removed from the pedal 72. These voltage outputs may be subsequently processed (e.g., amplified) and utilized to control the operation of the vehicle 10. The use of piezoelectric sensors in the embodiment of FIG. 2 may offer advantages because piezoelectric sensors are low in monetary cost, high in reliability, and available in multiple varieties.

Figure 3A:
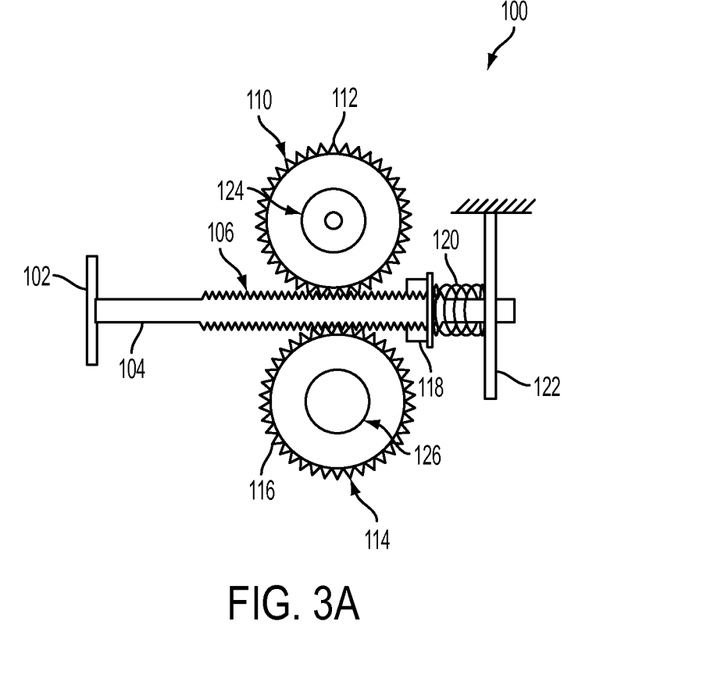
FIG. 3A is a schematic diagram of a front view of an electronic pedal system including a piezoelectric torsional sensor for sensing a force applied to a pedal and a force removed from the pedal, according to a presently disclosed embodiment.

FIG. 3A is a schematic illustrating an embodiment of a sensor assembly 100 including a pedal 102 coupled to a toothed rod 104 having a teethed portion 106 for interfacing with one or more components of the sensor assembly 100. For example, in the illustrated embodiment, a first gear wheel 110 includes teeth 112 configured to mate with the teethed portion 106 of the toothed rod 104. Similarly, a second gear wheel 114 includes teeth 116 configured to mate with the teethed portion 106 of the toothed rod 104 on an opposite side of the toothed rod 104 than the first gear wheel 110. A preloading nut 118 is also provided on the toothed rod 104 proximate a spring 120 adjacent a support plate 122, which may be, for example, anchored to the floor or dash panel of the vehicle 10.

The sensor assembly 100 further includes a first piezoelectric torsional sensor 124 coupled to the first gear wheel 110 and a second piezoelectric torsional sensor 126 coupled to the second gear wheel 114. FIG. 3B illustrates features of the first piezoelectric torsional sensor 124 in more detail. As shown, a rod 128 is coupled to the support plate 122 and receives the first piezoelectric torsional sensor 124 thereon. The rod 128 extends through the first gear wheel 110, thereby coupling the first piezoelectric torsional sensor 124 to the first gear wheel 110. In some embodiments, the second piezoelectric sensor 126 may be coupled to the second gear wheel 114 in a similar manner.

During operation, when a user depresses the pedal 102, the first gear wheel 110 and the second gear wheel 114 rotate, each in opposite directions. For example, in one embodiment, the first gear wheel 110 may be configured to rotate counter clockwise, and the second gear wheel 114 may be configured to rotate clockwise. In such an embodiment, the spring 120 may be utilized to preload one of the piezoelectric torsional sensors 124 and 126 to enable detection of an applied force and a removed force relative to the pedal 102. For example, in one embodiment, the spring 120 may be operated such that the second piezoelectric torsional sensor 126 of the second gear wheel 114 may be preloaded, and the first piezoelectric torsional sensor 124 of the first gear wheel 110 may not be preloaded. As the user applies pressure to the pedal 102, load may be removed from the second piezoelectric torsional sensor 126 and applied to the first piezoelectric torsional sensor 124, and the degree of rotation of each of the gear wheels 110 and 114 gives rise to a signal indicative of a force applied to or removed from the pedal 102.

Figure 3B:
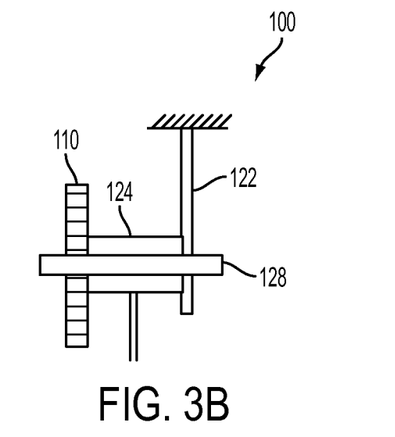
FIG. 3B is a schematic diagram illustrating features of the piezoelectric torsional sensor of the electronic pedal system of FIG. 3A, according to a presently disclosed embodiment.

The sensor assembly 100 of FIGS. 3A and 3B may offer one or more advantages over conventional level style pedal assemblies. For example, in embodiments in which the pedal 102 is floor mounted, the sensor assembly 100 may reduce or eliminate the likelihood that objects could become lodged between the pedal 102 and the floor of the vehicle 10, thus interfering with the transmission of the operator's desired control of the vehicle 10. This may be accomplished because the sensor assembly 100 may require little or no movement of the pedal 102 along a travel path toward the floor of the vehicle 10. For instance, the pressure applied by the user to the pedal 102 could be detected by a flexing of the first and second piezoelectric torsional sensors 124 and 126, thus reducing or eliminating the need for movement of the pedal 102.

Figure 4:
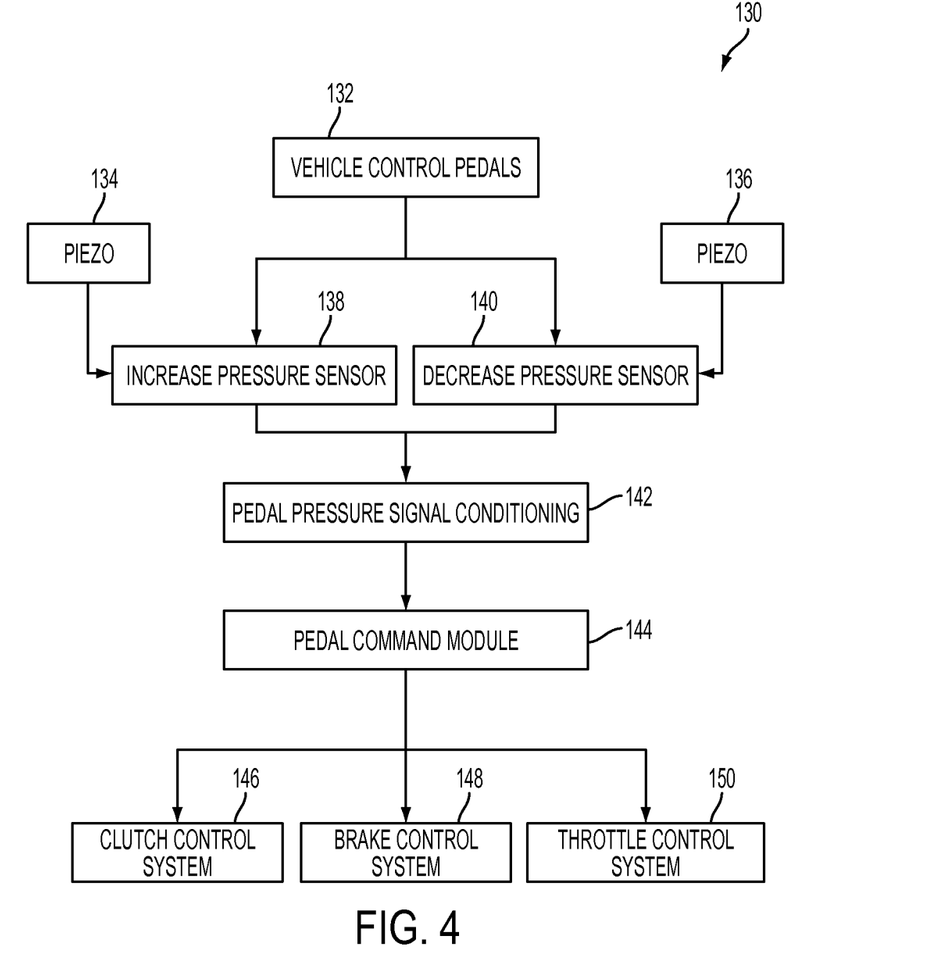
FIG. 4 is a flow chart illustrating a control method for processing the output of piezoelectric sensors to control a clutch system, a brake system, or a throttle system, according to a presently disclosed embodiment.

FIG. 4 is a flow chart illustrating a control method for processing the output of the first piezoelectric sensor 80, the second piezoelectric sensor 84, the first torsional piezoelectric sensor 124, and/or the second torsional piezoelectric sensor 126. In the illustrated embodiment, a force is applied to or removed from a vehicle control pedal (block 132), which may be a brake pedal, an accelerator pedal, a clutch pedal, or another vehicle pedal. Piezoelectric sensors 134 and 136 sense an increase in pressure (block 138) or a decrease in pressure (block 140), respectively. For example, in one embodiment, the piezoelectric sensors 134 and 136 produce a small voltage output in response to the force applied to or removed from the vehicle control pedal at block 132.

The sensor outputs are then transferred to a control system, such as ECU 30, for further processing and use in control of the vehicle 10. In the illustrated embodiment, the sensor outputs are received by the ECU 30 and undergo signal conditioning (block 142). For example, the signal produced by the piezoelectric sensors 134 and 136 may be a small voltage, and this voltage may be amplified at block 142 to make the signal more suitable for downstream use. Once amplified (or otherwise processed), the processed signals may then be transmitted to a pedal command module (block 144). The pedal command module may be a controller located, for example, in ECU 30, that receives the amplified signals and produces one or more outputs to exhibit control over, for example, a clutch control system (block 146), a brake control system (block 148), and/or a throttle control system (block 150). In some embodiments, the brake control system may be a brake-by-wire system, and the throttle control system may be a throttle-by-wire system.

The control commands generated by the pedal command module at block 144 may include any suitable commands that enable operation of the vehicle 10 in accordance with the input provided by the operator via the vehicle control pedals at block 132. For example, if the user depresses the brake pedal, the pedal command module at 144 may generate and transmit a command to the brake control system at block 148 to indicate that the speed of the vehicle 10 should be reduced. The brake control system may then initiate a series of commands to operate the machinery of the vehicle 10 to apply pressure to the wheels 43 to reduce the speed of the vehicle 10.

Figure 5:
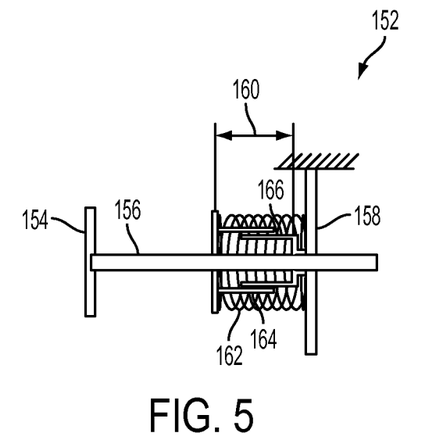
FIG. 5 is a schematic diagram illustrating an electronic pedal system including a capacitor sensor for sensing a force applied to a pedal and a force removed from the pedal, according to a presently disclosed embodiment.

FIG. 5 is a schematic illustrating an embodiment of a sensor assembly 152 including a pedal 154 coupled to a rod 156 configured to receive one or more components of the sensor assembly 152. A support plate 158 is provided to couple the pedal 154 to the vehicle 10 and may be, for example, anchored to the floor or dash panel of the vehicle 10. The sensor assembly 152 further includes a capacitor sensor 160 disposed along the rod 156 and a spring 162 within the capacitor sensor 160 proximate the support plate 158. The illustrated capacitor sensor 160 is a variable capacitor including a first cylinder 164 configured to receive a second cylinder 166 therein.

During operation, the sensor assembly 152 is configured to function as a position sensor in which the relative position of the first cylinder 164 with respect to the second cylinder 166 is used to determine the amount of force applied to or removed from the pedal 154. More specifically, when a user applies a force to the pedal 154, the second cylinder 166 becomes more fully received within the first cylinder 164, thus leading to an increased capacitance. The change in the distance between the cylinders 164 and 166 dictates the capacitive change that corresponds to the amount of force applied to or removed from the pedal 154. In such a way, the position of the capacitor sensor 160, rather than the pressure applied to the sensor, as in the embodiments of FIGS. 2 and 3A, is used to determine the amount of force applied to the pedal 154.

However, it should be noted that the embodiments of the piezoelectric sensors 80, 84, 110, and 114 shown in FIGS. 2 and 3A and the capacitor sensor 160 shown in FIG. 5 are merely examples and are subject to a variety of implementation-specific considerations. For example, in some embodiments, the capacitor sensor 160 may further include a medium, such as coal, chemically resistant paper, air, fibrous paper, etc. In some embodiments, the medium may be any suitable insulative material, while in other implementations it may be an electrical insulator with protective characteristics, such as mica.

Further, it should be noted that the choice between using a position-based sensor assembly and a force-based sensor assembly may depend on one or more implementation-specific considerations. For example, in embodiments employing capacitive sensing, a power source may be required to supply power to the capacitor sensor, while embodiments making use of piezoelectric sensing may be capable of operation with coupling to a power source.

Figure 6:
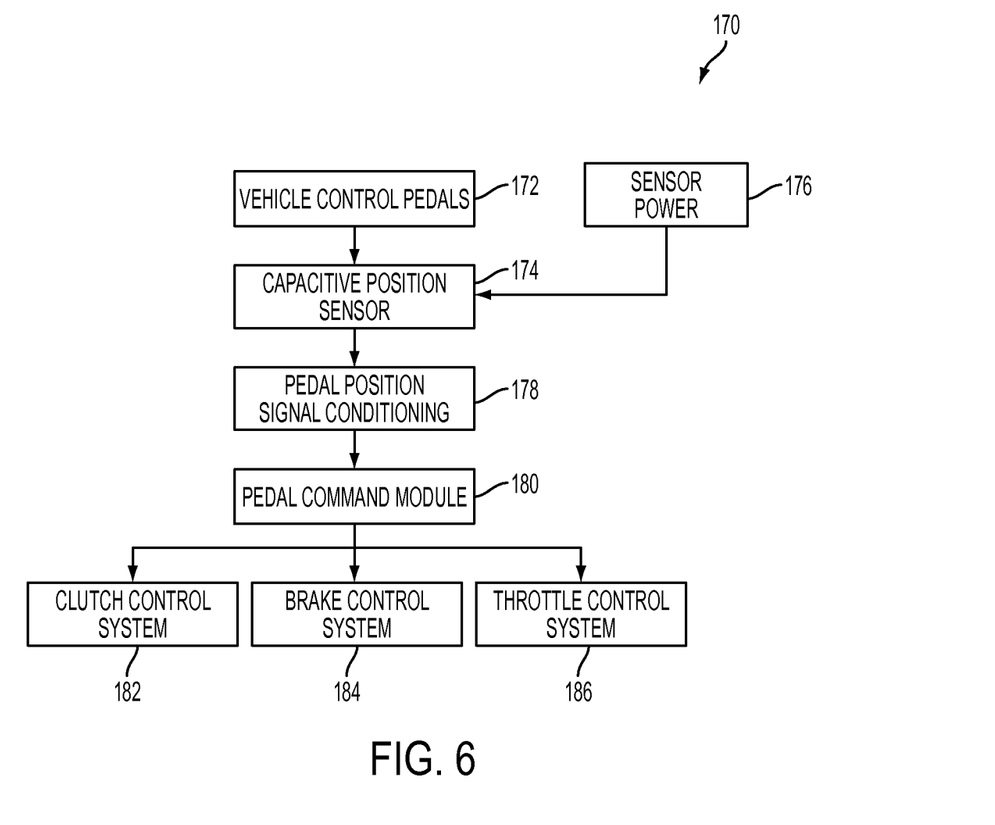
FIG. 6 is a flow chart illustrating a control method for processing the output of a capacitor sensor to control a clutch system, a brake system, or a throttle system, according to a presently disclosed embodiment.

FIG. 6 is a flow chart illustrating an embodiment of a method 170 for processing the signals from the capacitor sensor 160. In this embodiment, a user applies a force to a vehicle control pedal (block 172), which is sensed by the capacitive position sensor (block 174) being powered by a sensor power source (block 176). The sensor power source may include any suitable source of alternating current (AC) or direct current (DC) power, including but not limited to a battery, a solar cell, solar power, a vehicle engine, and so forth. As before, the sensed signal is passed to a pedal position signal conditioning module (block 178) to process and condition the raw signal from the capacitive position sensor at block 174. For example, the signal may be amplified, rectified, or otherwise processed to render the signal more compatible with the downstream circuitry of the vehicle 10. Once processed, the signal is transferred to the pedal command module (block 180), which utilizes the processed signal to generate control commands for one or more of a clutch control system (block 182), a brake control system (block 184), and a throttle control system (block 186).

Figure 7:
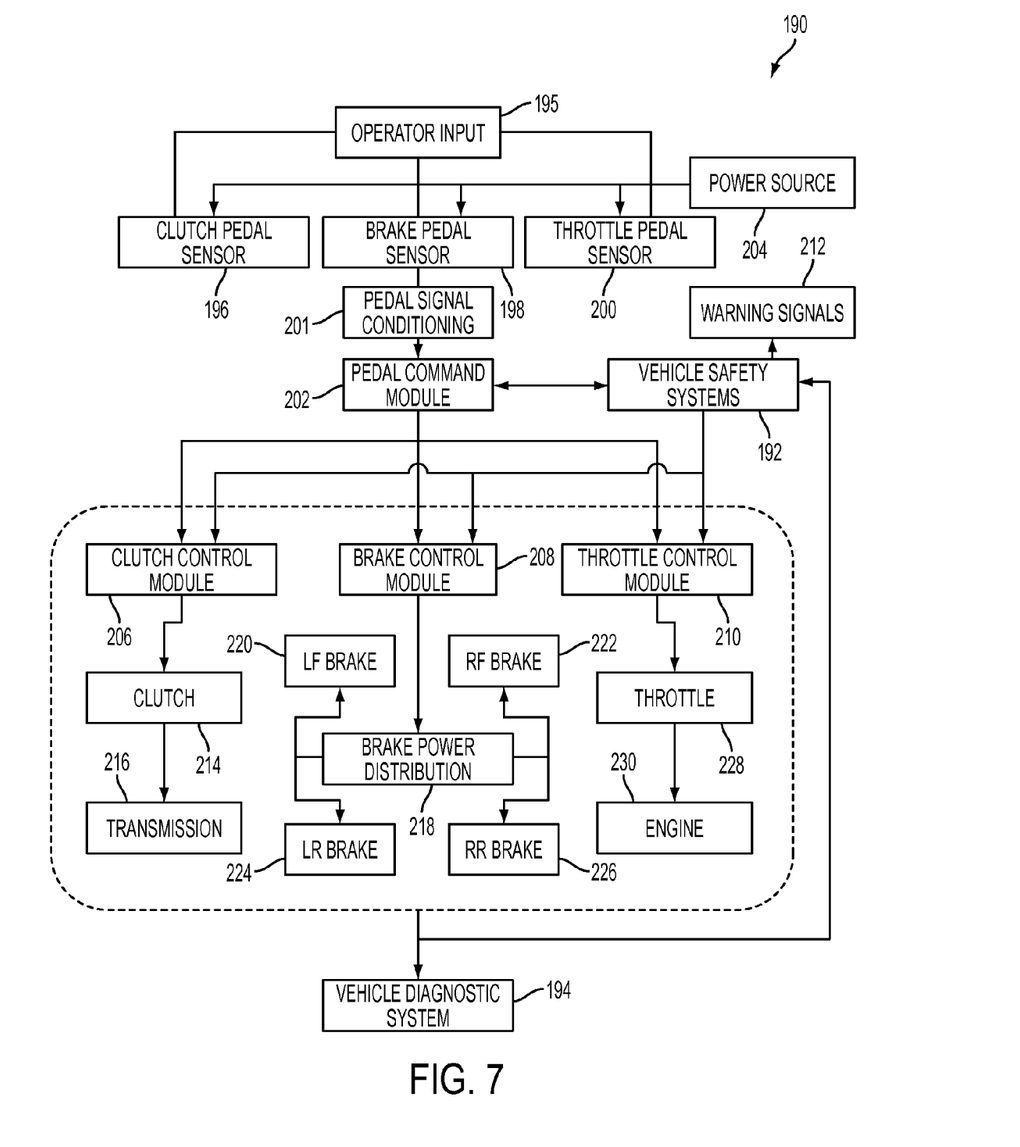
FIG. 7 is a flow chart illustrating a control method for processing the output of sensors associated with pedals to control a motor vehicle in coordination with a vehicle safety system and a vehicle diagnostic system, according to a presently disclosed embodiment.

FIG. 7 is a flow chart illustrating an embodiment of a method 190 for integrating the pedal sensor control systems with one or more other vehicle control systems, such as a vehicle safety system (block 192) and a vehicle diagnostic system (block 194). In this embodiment, the vehicle operator provides input (block 195), for example, by depressing a pedal or releasing force from a pedal. One or more position-based or force-based sensors, such as a clutch pedal sensor (block 196), a brake pedal sensor (block 198), and a throttle pedal sensor (block 200), sense the operator input and transfers the sensed signal to the pedal signal conditioning module (block 201), which processes the raw signals and transmits the processed signals to a pedal command module (block 202). In embodiments in which one or more of the sensors requires power (e.g., a capacitor sensor), a power source (block 204) may be provided to power the sensing operation.

In this embodiment, the pedal command module (block 202) cooperates with the vehicle safety system (block 192) to control a clutch control module (block 206), a brake control module (block 208), and a throttle control module (block 210), which are each communicatively coupled to both the pedal command module and the vehicle safety system in the illustrated embodiment (though other embodiments may include different communication paths).

The vehicle safety system (block 192) is communicatively coupled to the vehicle diagnostic system (block 194) and operates to ensure that the vehicle 10 is operated within one or more safety thresholds. For example, the vehicle safety system may evaluate the commands being generated by the pedal command module to ensure that such commands are within predetermined safety limits. Further, the vehicle safety system may alert the operator to the presence of a safety error via warning signals (block 212), or may operate to override or inform the action commands sent to the control modules 206, 208, and 210 form the pedal command module. The safety error may be communicated to the driver as warning signals communicated to the driver, for example, by vibrating the steering wheel, displaying a warning on an operator interface in the vehicle, displaying the warning on a heads-up display, sounding an alarm in the vehicle, wirelessly communicating with a personal device that sounds an alarm, or any other way of alerting the operator to the safety error.

It is contemplated that the warning signals may also provide recommended actions to correct the safety error, or alternative safety instructions for the driver to follow. It also is contemplated that the vehicle safety systems at block 192 may include, but are not limited to impact avoidance systems, following distance warning systems, and steer-by-brake control systems.

The coordination of the pedal command module at block 202 and the vehicle safety systems at block 192 results in operational commands being transmitted to the control modules at 206, 208, and 210. In response to such commands, the control modules then operate their respective system components to carry out the driver commands communicated via the operator input at block 195. For example, the clutch control module (block 206) controls operation of the clutch (block 214) and the transmission (block 216) to provide engagement or disengagement, depending on the operator input (block 195).

Similarly, the brake control module (block 208) sends commands to the brake power distribution module (block 218), which directly controls a left front brake (block 220), a right front brake (block 222), a left rear brake (block 224), and a right rear brake (block 226). In some embodiments, the brake power distribution module may control break steer by employing an anti-lock brake system (ABS). Further, the throttle control module (block 210) issues control commands to operate a throttle (block 228) and an engine (block 230) in accordance with operator input (block 195) provided, for example, via an accelerator pedal.

While the present teachings have been disclosed in terms of exemplary embodiments in order to facilitate better understanding of the present teachings, it should be appreciated that the present teachings can be embodied in various ways without departing from the principle of the teachings. Indeed, the present teachings should be understood to include all possible embodiments that can be embodied without departing from the principle of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiments described herein be considered as examples only.

What is claimed is:

1. A pedal system for a vehicle, comprising:
    a pedal configured to receive an applied pressure when a user applies a force on the pedal;
    a first sensor comprising piezoelectric material and configured to produce a first voltage output corresponding to the applied pressure when the user applies the force on the pedal; and
    a second sensor comprising piezoelectric material and configured to produce a second voltage output corresponding to an amount of pressure released from the pedal when the user at least partially removes the force from the pedal.

2. The system of claim 1, comprising a first pressure plate positioned proximate the first sensor and a first spring configured to expand and contract to exhibit a force on the first pressure plate, wherein the force on the first pressure plate is configured to be measured by the first sensor.

3. The system of claim 2, comprising a second pressure plate positioned proximate the second sensor and a second spring configured to expand and contract to exhibit a force on the second pressure plate, wherein the force on the second pressure plate is configured to be measured by the second sensor, and wherein when the first spring is expands, the second spring contracts, and when the first spring contracts, the second spring expands.

4. The system of claim 1, further comprising a controller configured to receive the first and second voltage outputs, to condition the first and second voltage outputs, and to produce a pedal command based on the conditioned first and second voltage outputs.

5. The system of claim 4, wherein the produced pedal command comprises a control instruction for a clutch control system, a brake control system, a throttle control system, or a combination thereof.

6. A method of operating a pedal control system for a vehicle, comprising:
   sensing an applied pressure to a pedal with a first piezoelectric sensor when a user applies a force on the pedal;
   producing a first voltage output corresponding to the applied pressure;
   controlling one of a brake system, a clutch system, and a throttle system of the vehicle based on the first voltage output;
   sensing a released pressure corresponding to an amount of pressure released from the pedal when the user at least partially removes the force from the pedal with a second piezoelectric sensor; and
   producing a second voltage output corresponding to the released pressure; and
   controlling the one of the brake system, the clutch system, and the throttle system based on the second voltage output.

7. The method of claim 6, comprising processing the first and/or second voltage outputs with a vehicle safety system to determine one or more recommended changes to the control of the brake system, the clutch system, and/or the throttle system based on the first and/or second voltage outputs.

8. The method of claim 7, comprising overriding the control of the brake system, the clutch system, and/or the throttle system based on the recommended changes.

9. The method of claim 7, comprising alerting an operator to the one or more recommended changes and prompting the operator to accept the one or more recommended changes.

10. The method of claim 7, comprising amplifying the first and second voltage outputs before controlling the one of the brake system, the clutch system, and the throttle system of the vehicle.

11. An electronic pedal control system for a vehicle, comprising:
   a first sensor configured to produce a first output corresponding to a user applied force;
   a second sensor configured to produce a second output corresponding to a release of user applied force; and
   a controller configured to receive the first output and the second output and to control one of a brake system, a clutch system, and a throttle system of the vehicle based on the first and second outputs,
   wherein the first and second sensors are positioned relative to one another such that an application of force to the first sensor unloads the second sensor and the removal of force from the first sensor loads the second sensor.

12. The system of claim 11, wherein the first and second sensors comprise piezoelectric sensors, and the first output and the second output comprise voltage outputs.

13. The system of claim 11, wherein the user applied force comprises a force applied to a pedal of a vehicle by a vehicle user.

14. The system of claim 11, wherein the controller is configured to transmit the first and second outputs to a vehicle safety system, to receive feedback from the vehicle safety system, and to utilize the feedback from the vehicle safety system to control the one of the brake system, the clutch system, and the throttle system.

15. An electronic pedal simulator for a vehicle, comprising:
   a first sensor configured to produce a first output corresponding to a user applied force; and
   a second sensor configured to produce a second output corresponding to a release of user applied force;
   the first and second sensors being positioned such that an application of force to the first sensor unloads the second sensor and the removal of force from the first sensor loads the second sensor.

16. The system of claim 15, wherein the first and second sensors comprise piezoelectric sensors or capacitive sensors.

17. A method of operating an electronic pedal system of a vehicle, comprising:
   sensing a user applied force with a first sensor;
   producing a first output corresponding to the sensed applied force;
   in response to a user at least partially removing the applied force from the first sensor, sensing with a second sensor a change in force corresponding to an amount of force released by the user;
   producing a second output corresponding to the change in force; and
   with a vehicle controller, controlling one of a brake system, a clutch system, and a throttle system of the vehicle based on the first and second outputs.

18. The method of claim 17, comprising receiving feedback from a vehicle safety system regarding at least one of crash avoidance, following distance, and steer-by-brake control and controlling the one of the brake system, the clutch system, and the throttle system based at least in part on the received feedback.

19. The method of claim 17, wherein the first sensor and the second sensor comprise piezoelectric sensors.

20. The method of claim 17, wherein the first sensor and the second sensor comprise capacitive sensors.

* * * * *